United States Patent
S. P. et al.

(10) Patent No.: US 11,346,083 B1
(45) Date of Patent: May 31, 2022

(54) FLUID FLUSHING SYSTEM FOR A HYDRAULIC CIRCUIT OF A WORK MACHINE

(71) Applicant: Caterpillar Inc., Peoria, IL (US)

(72) Inventors: Anand S. P., Tirunelveli (IN); Elangovan. U, Otteri (IN); Prasana. R, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/303,973

(22) Filed: Jun. 11, 2021

(51) Int. Cl.
*F16H 61/4104* (2010.01)
*E02F 9/22* (2006.01)

(52) U.S. Cl.
CPC ............ *E02F 9/2285* (2013.01); *E02F 9/226* (2013.01); *E02F 9/2267* (2013.01); *F16H 61/4104* (2013.01)

(58) Field of Classification Search
CPC ................................................... F16H 61/4104
See application file for complete search history.

(56) References Cited

U.S. PATENT DOCUMENTS

| | | | | |
|---|---|---|---|---|
| 3,952,511 A * | 4/1976 | Turner | ................. | B60K 17/356 60/430 |
| 4,369,625 A * | 1/1983 | Izumi | ................... | E02F 9/2292 414/699 |
| 5,427,195 A * | 6/1995 | Paul | ....................... | B60K 17/30 180/242 |
| 5,613,361 A * | 3/1997 | Dantlgraber | ............ | B29C 45/82 60/427 |
| 6,339,928 B1 * | 1/2002 | Gollner | ................... | F16H 57/04 60/464 |
| 6,430,923 B1 | 8/2002 | Meier | | |
| 7,111,458 B2 | 9/2006 | Gandrud | | |
| 7,231,764 B2 * | 6/2007 | Mangano | .............. | F16K 17/003 60/464 |
| 7,401,466 B2 * | 7/2008 | Von Baeumen | ........ | F04B 15/02 60/464 |
| 9,267,590 B2 * | 2/2016 | Essig | ..................... | B60K 23/08 |
| 9,394,924 B2 * | 7/2016 | Berg | ....................... | F15B 13/06 |
| 9,683,588 B2 | 6/2017 | Sadamori et al. | | |
| 10,119,556 B2 * | 11/2018 | Peterson | ............... | E02F 9/2289 |
| 10,808,838 B2 | 10/2020 | Gepraegs et al. | | |
| 2014/0150880 A1 * | 6/2014 | Rousseau | .................. | F03C 1/26 137/2 |

FOREIGN PATENT DOCUMENTS

| | | | | |
|---|---|---|---|---|
| CN | 204477450 U | 7/2015 | | |
| CN | 209115428 U | 7/2019 | | |
| CN | 111924734 A | 11/2020 | | |
| DE | 102008060066 A1 * | 6/2010 | ......... | F16H 61/4026 |
| DE | 102009047732 A1 * | 6/2011 | ......... | F16H 61/4165 |
| DE | 102011119427 A1 * | 5/2013 | ......... | F16H 61/4104 |
| JP | S61127967 A | 6/1986 | | |

* cited by examiner

*Primary Examiner* — Michael Leslie

(57) ABSTRACT

A system for controlling an operation of a hydrostatic circuit of a work machine includes a flush control valve. The flush control valve is configured to be fluidly coupled to the hydrostatic circuit. The hydrostatic circuit is configured to operate in at least two operating modes to supply fluid power to selectively run a plurality of sub-systems of the work machine. In at least one operating mode of the at least two operating modes of the hydrostatic circuit, the flush control valve is configured to move and regulate a flushing flow rate of the fluid to equalize the flushing flow rate with a desired flushing flow rate based on a signal indicative of the at least one operating mode.

20 Claims, 5 Drawing Sheets

FLUID FLUSHING SYSTEM FOR A HYDRAULIC CIRCUIT OF A WORK MACHINE

TECHNICAL FIELD

The present disclosure relates to a system and method for flushing a hydraulic circuit (e.g., a closed loop hydrostatic circuit) of a work machine. More particularly, the present disclosure relates to a system and method for flushing the hydrostatic circuit based on operating modes of the hydrostatic circuit.

BACKGROUND

A work machine, such as a drilling machine, is generally equipped with one or more hydraulic or hydrostatic circuits that may be applied to selectively perform operations in various operating modes associated with the functioning of the work machine. As an example, one operating mode may include a tramming mode (e.g., when traction devices of the work machine are driven and the work machine is moved), while another operating mode may include a drilling mode (e.g., when one or more implements such as a drill of the work machine is operated). To accomplish operations in such operating modes, hydrostatic circuits generally include one or more pumps that may selectively supply pressurized fluid to one or more actuators of the work machine. Further, the hydrostatic circuits may include a diverter valve that enables the hydrostatic circuits to switch between the operating modes. For example, in the tramming mode, the pumps of respective hydrostatic circuits may supply pressurized fluid to the actuators such as tramming motors, and in the drilling mode, the pumps may supply pressurized fluid to other actuators, such as feed cylinders and drill motors.

Such hydrostatic circuits are typically closed loop circuits in which the fluid circulates between the pump and the actuator. During operation, a portion of the fluid is generally flushed out as the fluid may become heated and/or may lose certain lubricating properties, such as viscosity. Fresh fluid may be simultaneously introduced into the hydrostatic circuit to replenish the hydrostatic circuit with fluid for uninterrupted operation of the hydrostatic circuit. However, a rate at which the fluid is flushed out of the hydrostatic circuit in one operating mode may be inapplicable for one or more of the other operating modes.

U.S. Pat. No. 7,111,458 discloses a loop flushing circuit in a closed circuit hydraulic system. The loop flushing circuit includes a variable displacement hydraulic pump that is fluidly connected to a hydraulic motor, an electronically proportional flow control valve to control a flushing flow in the closed circuit hydraulic system, and a control means that controls the electronically proportional flow control valve and ensures that the electronically proportional flow control valve is connected to a low pressure side of the closed loop flushing circuit.

SUMMARY OF THE INVENTION

In an aspect, the present disclosure relates to a system for controlling an operation of a hydrostatic circuit of a work machine. The system includes a flush control valve configured to be fluidly coupled to the hydrostatic circuit. The hydrostatic circuit is configured to operate in at least two operating modes to supply fluid power to selectively run a plurality of sub-systems of the work machine. In at least one operating mode of the at least two operating modes of the hydrostatic circuit, the flush control valve is configured to move and regulate a flushing flow rate of the fluid to equalize the flushing flow rate with a desired flushing flow rate based on a signal indicative of the at least one operating mode.

In another aspect, the present disclosure is directed to a method controlling an operation of a hydrostatic circuit of a work machine. The method includes fluidly coupling a flush control valve to the hydrostatic circuit. The hydrostatic circuit is configured to operate in at least two operating modes to supply fluid power to selectively run a plurality of sub-systems of the work machine. In at least one operating mode of the at least two operating modes of the hydrostatic circuit, the flush control valve is configured to move and regulate a flushing flow rate of the fluid to equalize the flushing flow rate with a desired flushing flow rate based on a signal indicative of the at least one operating mode.

In yet another aspect, the present disclosure relates to a work machine. The work machine includes a plurality of sub-systems, a hydrostatic circuit, and a flush control valve configured to be fluidly coupled to the hydrostatic circuit. The hydrostatic circuit is configured to operate in at least two operating modes to supply fluid power to selectively run the plurality of sub-systems. In at least one operating mode of the at least two operating modes of the hydrostatic circuit, the flush control valve is configured to move and regulate a flushing flow rate of the fluid to equalize the flushing flow rate with a desired flushing flow rate based on a signal indicative of the at least one operating mode.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts, e.g., 1, 1', 1", 101 and 201 could refer to comparable components used in the same and/or different depicted embodiments.

Figure 1:
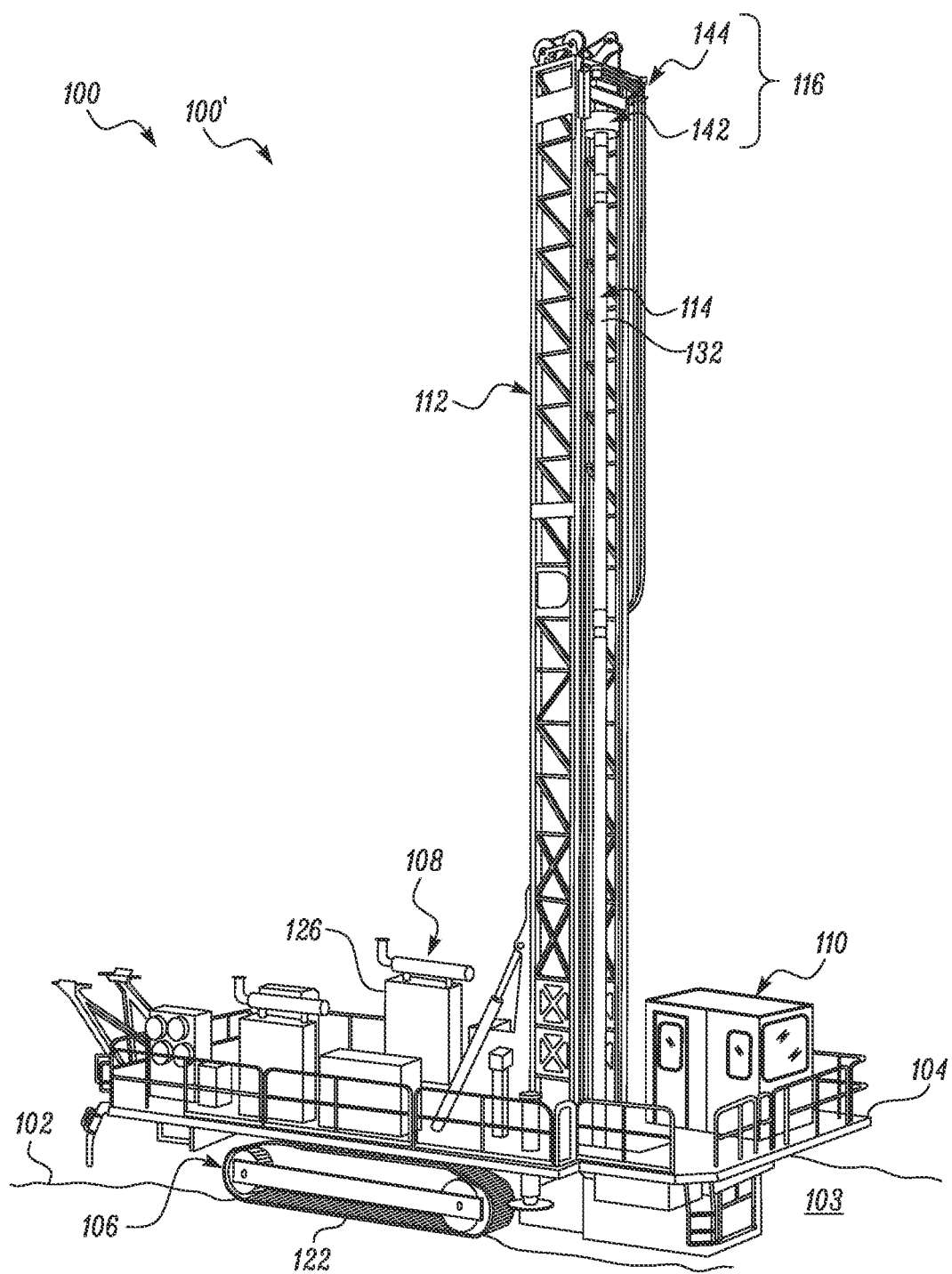
FIG. 1 illustrates an exemplary work machine having multiple sub-systems, in accordance with an embodiment of the present disclosure.

Referring to FIG. 1, a work machine 100 is illustrated. The work machine 100 may be used in a variety of applications including mining, quarrying, road construction, construction site preparation, etc. For example, the work machine 100 of the present disclosure is a drilling machine 100' employed to perform a tramming operation, i.e., to move from one location to another location at a jobsite 102, and a drilling operation, i.e., to penetrate the earth to mine for materials, such as ore, soil, debris, or other naturally occurring deposits at the jobsite 102. The drilling machine 100' may include one of a blast-hole drilling machine, a rotary drilling machine, a surface drilling machine, or any other drilling machine known in the art.

The work machine 100 includes a chassis 104, ground-engaging traction assemblies 106, an engine system 108, an operator cabin 110, a mast 112, a drilling assembly 114, and a plurality of sub-systems 116. The chassis 104 may support the engine system 108, the operator cabin 110, the mast 112, the drilling assembly 114, and the sub-systems 116, although other known components and structures may be supported by the chassis 104, as well.

The ground-engaging traction assemblies 106 may support the chassis 104 on a ground 103 at the jobsite 102. The ground-engaging traction assemblies 106 may be configured to move and propel the work machine 100 from one location to another during the tramming operation. In the present embodiment, two ground-engaging traction assemblies 106 are provided (see FIG. 2), one on each side of the work machine 100, i.e., a first ground-engaging traction assembly 122 (or right-hand side ground-engaging traction assembly) and a second ground-engaging traction assembly 124 (or left-hand side ground-engaging traction assembly).

The engine system 108 may include an engine compartment 126 and a power source 128 (see FIG. 2), such as an internal combustion engine, provided within the engine compartment 126. The power source 128 may be configured to power operations of various systems and/or sub-systems and/or hydrostatic circuits on the work machine 100, typically by combusting fuel. Optionally, the engine system 108 may include an electrical power source, applicable either alone or in combination with the internal combustion engine.

The operator cabin 110 may be supported over the chassis 104. The operator cabin 110 may facilitate stationing of one or more operators therein, to monitor the operations of the work machine 100. Also, the operator cabin 110 may house various components and controls of the work machine 100, access to one or more of which may help the operators to control the machine's movement and/or operation. For example, the operator cabin 110 may include an input device 130 that may be used and/or actuated to generate an input for facilitating control of various systems and/or sub-systems associated with the work machine 100.

The mast 112 may be coupled and mounted to the chassis 104. As an example, the mast 112 may be pivotably coupled to the chassis 104 to move between a first position and a second position with respect to the chassis 104. For example, the first position of the mast 112 may be a position at which the work machine 100 may perform the drilling operation. For example, the second position of the mast 112 may be a position at which the mast 112 may be stowed on the work machine 100, and in which position, the work machine 100 may perform the tramming operation. The configuration of the mast 112 in FIG. 1 illustrates the first position of the mast 112.

The drilling assembly 114 may be accommodated within the mast 112. The drilling assembly 114 may include multiple pipe segments 132 (e.g., drill pipes as part of a drill string, drill rods, drill extenders, etc.) configured to operate in concert for drilling and/or penetrating into the ground 103 at the jobsite 102. Also, the drilling assembly 114 may include several other drilling components, such as a drill carousel, a drill bit, and the like, however, such drilling components are not discussed, as they may be contemplated by someone of skill in the art.

The sub-systems 116 may include tram motors 140 (please see FIG. 2), a drill motor assembly 142, and a feed cylinder 144. The tram motors 140 may be coupled to the ground-engaging traction assemblies 106 and may provide power to the ground-engaging traction assemblies 106 in order to propel, turn, or otherwise maneuver the work machine 100 at the jobsite 102 during a tramming operation of the work machine 100. For example, two tram motors 140 are provided, i.e., a first tram motor 146 coupled to the first ground-engaging traction assembly 122 and a second tram motor 148 coupled to the second ground-engaging traction assembly 124.

The drill motor assembly 142 may be movably mounted on the mast 112. The drill motor assembly 142 may be coupled to the at least one pipe segment 132 and may rotate the pipe segment 132 to perform the drilling operation. In the present embodiment, the drill motor assembly 142 may include a two-way fixed displacement drill motor 150 and a two-way variable displacement drill motor 152 (please see FIG. 2), each configured to receive fluid to selectively rotate the pipe segment 132 for performing the drilling operation.

Figure 2:
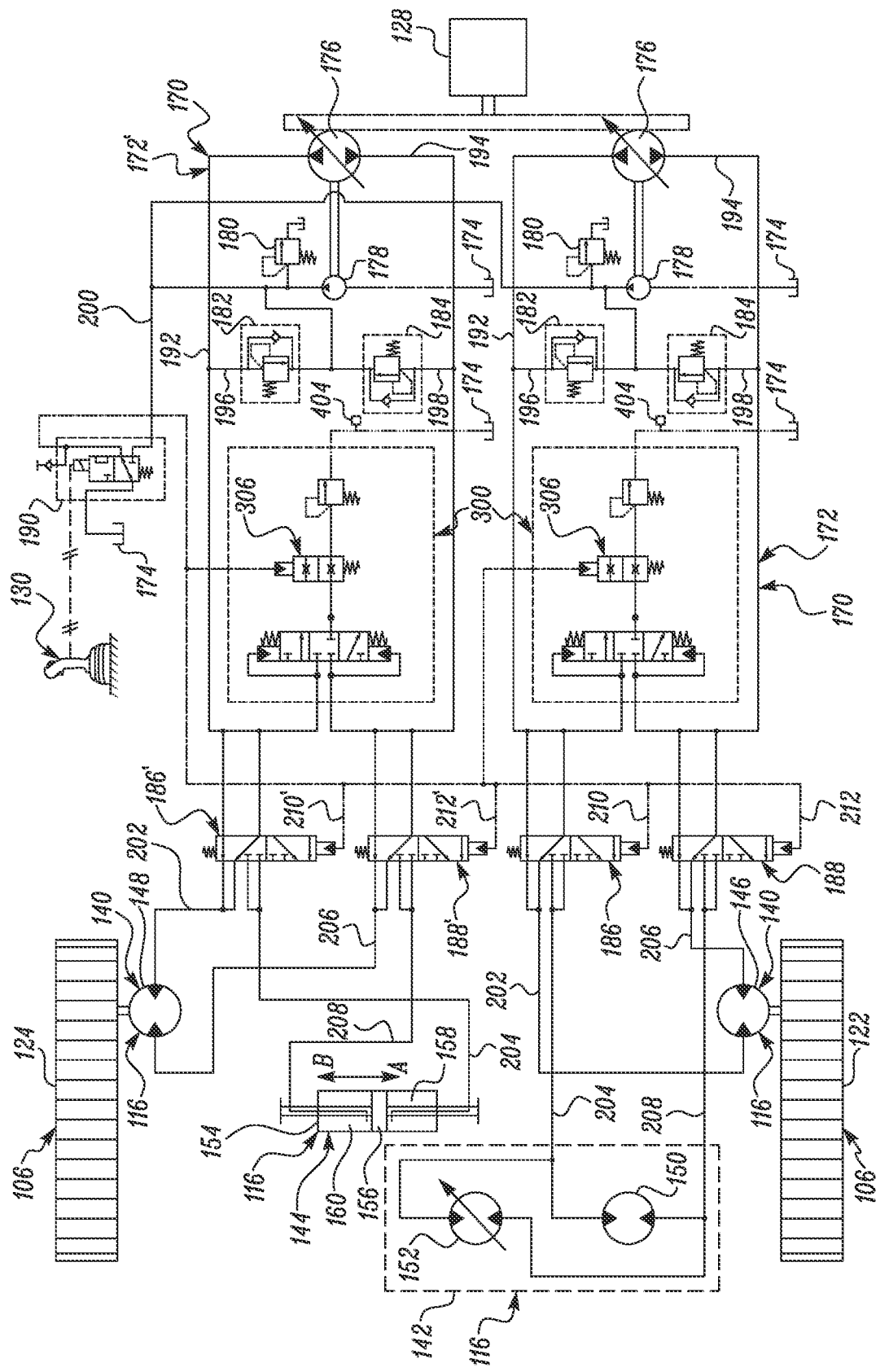
FIG. 2 illustrates a schematic diagram of a first hydrostatic circuit and a second hydrostatic circuit that facilitate the selective operations of the sub-systems of the work machine, in accordance with an embodiment of the present disclosure.

The feed cylinder 144 may be connected to the drill motor assembly 142. In the present embodiment, as shown in FIG. 2, the feed cylinder 144 may include a barrel 154, and a piston 156 accommodated within the barrel 154 and configured to divide the barrel 154 into a first chamber 158 and a second chamber 160. Both the first chamber 158 and the second chamber 160 may be configured to receive fluid for displacing the barrel 154 with respect to the piston 156 to extend or retract the feed cylinder 144. Accordingly, the feed cylinder 144 may move the drill motor assembly 142 and the pipe segment 132 along the mast 112 toward or away from the ground 103. For example, the first chamber 158 may receive fluid to move the barrel 154 in a first direction 'A' to move the drill motor assembly 142 along the mast 112 in a direction away from the ground, and the second chamber 160 may receive fluid to move the barrel 154 in a second direction 'B' to move the drill motor assembly 142 along the mast 112 in the opposite direction toward the ground 103.

Continuing with FIG. 2, two hydrostatic circuits 170 are shown—a first hydrostatic circuit 172 and a second hydrostatic circuit 172'. Each hydrostatic circuit 170 is configured to supply power (e.g., fluid power) to run the sub-systems 116. Further, each hydrostatic circuit 170 is configured to operate in at least two operating modes based on the operations (drilling, tramming, etc.) performed by the work machine 100.

The first hydrostatic circuit 172 is a closed loop circuit. The first hydrostatic circuit 172 is fluidly coupled (e.g., hydraulically connected) to the two sub-systems 116 (i.e., the drill motor assembly 142 and the first tram motor 146). The first hydrostatic circuit 172 is configured to operate in one operating mode (e.g., a first operating mode as shown in FIG. 2) to supply fluid power to the first tram motor 146, and in another operating mode (e.g., a second operating mode) to supply fluid power to the drill motor assembly 142.

Similarly, the second hydrostatic circuit 172' is a closed loop circuit. The second hydrostatic circuit 172' is fluidly coupled (e.g., hydraulically connected) to the remaining two sub-systems 116 (i.e., the feed cylinder 144 and the second tram motor 148). The second hydrostatic circuit 172' is configured to operate in one operating mode (e.g., a first operating mode as shown in FIG. 2) to supply fluid power to the second tram motor 148, and in another operating mode (e.g., a second operating mode) to supply fluid power to the feed cylinder 144.

The first hydrostatic circuit 172 is now discussed. The first hydrostatic circuit 172 may include a hydrostatic pump 176, a first cross port relief valve 182, a second cross port relief valve 184, a first diverter valve 186, a second diverter valve 188, and a function mode activation valve 190. Further, the first hydrostatic circuit 172 may be fluidly coupled to a reservoir 174 (to store fluid), a charge pump 178, a charge pressure relief valve 180, and a cooler (not shown).

The hydrostatic pump 176 may be coupled to the power source 128. The hydrostatic pump 176 may be a variable displacement hydrostatic pump configured to supply the fluid to the at least one sub-system 116. For example, the hydrostatic pump 176 may supply the fluid to the drill motor assembly 142 or to the first tram motor 146, via either a first fluid line 192 or a second fluid line 194. The charge pump 178 may be mechanically coupled to the hydrostatic pump 176. Also, the charge pump 178 may be fluidly coupled with the reservoir 174 to draw the fluid from the reservoir 174 and deliver the fluid either to the first fluid line 192 (e.g., via a first charge line 196) or to the second fluid line 194 (e.g., via a second charge line 198). In addition, the charge pump 178 may be fluidly coupled to the function mode activation valve 190 via a third charge line 200. The charge pressure relief valve 180 may establish a pressure at which the charge pump 178 delivers the fluid either to the first fluid line 192 or to the second fluid line 194. The first cross port relief valve 182 and the second cross port relief valve 184 may prevent backflow of the fluid either from the first fluid line 192 or from the second fluid line 194 to the charge pump 178.

The first diverter valve 186 may be disposed along the first fluid line 192 between the hydrostatic pump 176 and the two sub-systems 116 (i.e., the drill motor assembly 142 and the first tram motor 146). The first diverter valve 186 may be fluidly coupled to the first tram motor 146 (e.g., via a first supply/return line 202), and to the drill motor assembly 142 (e.g., via a second supply/return line 204). The first diverter valve 186 may be configured to move between a first position (as shown in FIG. 2) and a second position. In the first position, the first diverter valve 186 may fluidly couple the first fluid line 192 and the first supply/return line 202. In that manner, the first diverter valve 186 may direct the fluid from the hydrostatic pump 176 to the first tram motor 146 via the first supply/return line 202, or may direct the fluid from the first tram motor 146 to the hydrostatic pump 176 via the first supply/return line 202. In the second position, the first diverter valve 186 may fluidly couple the first fluid line 192 and the second supply/return line 204. In that manner, the first diverter valve 186 may direct the fluid from the hydrostatic pump 176 to the drill motor assembly 142 via the second supply/return line 204, or may direct the fluid from the drill motor assembly 142 to the hydrostatic pump 176 via the second supply/return line 204.

Similarly, the second diverter valve 188 may be disposed along the second fluid line 194 between the hydrostatic pump 176 and the two sub-systems 116 (i.e., the drill motor assembly 142 and the first tram motor 146). The second diverter valve 188 may be fluidly coupled to the first tram motor 146 (e.g., via a third supply/return line 206), and to the drill motor assembly 142 (e.g., via a fourth supply/return line 208). The second diverter valve 188 may be configured to move between a first position (as shown in FIG. 2) and a second position. In the first position, the second diverter valve 188 may fluidly couple the second fluid line 194 and the third supply/return line 206. In that manner, the second diverter valve 188 may direct the fluid from the hydrostatic pump 176 to the first tram motor 146 via the third supply/return line 206, or may direct the fluid from the first tram motor 146 to the hydrostatic pump 176 via the third supply/return line 206. In the second position, the second diverter valve 188 may fluidly couple the second fluid line 194 and the fourth supply/return line 208. In that manner, the second diverter valve 188 may direct the fluid from the hydrostatic pump 176 to the drill motor assembly 142 via the fourth supply/return line 208, or may direct the fluid from the drill motor assembly 142 to the hydrostatic pump 176 via the fourth supply/return line 208.

The function mode activation valve 190 may be fluidly coupled to the first diverter valve 186 and the second diverter valve 188 via pilot lines 210, 212, respectively. The function mode activation valve 190 may be configured to receive an input associated with the operation (e.g., drilling, tramming, etc.) of the work machine 100, e.g., from the input device 130. Based on the input, the function mode activation valve 190 may be configured to move between a first position (as shown in FIG. 2) and a second position. In the first position, the function mode activation valve 190 may fluidly decouple the third charge line 200 with the pilot lines 210, 212. Accordingly, the function mode activation valve 190 may control the first diverter valve 186 and the second diverter valve 188 to synchronously move to their corresponding first positions (as shown in FIG. 2). In the second position, the function mode activation valve 190 may fluidly couple the third charge line 200 with the pilot lines 210, 212. Accordingly, the function mode activation valve 190 may control the first diverter valve 186 and the second diverter valve 188 to synchronously move to their corresponding second positions.

As shown in FIG. 2, the second hydrostatic circuit 172' may include a third diverter valve 186' and a fourth diverter valve 188' similar to the first diverter valve 186 and the second diverter valve 188 of the first hydrostatic circuit 172. The third diverter valve 186' may be disposed along a corresponding first fluid line 192 between a corresponding hydrostatic pump 176 of the second hydrostatic circuit 172' and the remaining two sub-systems 116 (i.e., the feed cylinder 144 and the second tram motor 148). The fourth diverter valve 188' may be disposed along a corresponding second fluid line 194 between the corresponding hydrostatic pump 176 and the remaining two sub-systems 116. All remaining elements of the second hydrostatic circuit 172' may be the same or similar to corresponding elements of the first hydrostatic circuit 172 and may be denoted by the same reference numerals as previously used for simplicity.

Similar to the first diverter valve 186 and the second diverter valve 188, the function mode activation valve 190 may control the third diverter valve 186' and the fourth diverter valve 188', via respective pilot lines 210', 212'. Accordingly, the function mode activation valve 190 may move to the first position to fluidly decouple the third charge line 200 with the pilot lines 210', 212', to control the third diverter valve 186' and the fourth diverter valve 188' to synchronously move to their corresponding first positions (as shown in FIG. 2). Also, the function mode activation valve 190 may move to the second position to fluidly couple the third charge line 200 with the pilot lines 210', 212', to control the third diverter valve 186' and the fourth diverter valve 188' to synchronously move to their corresponding second positions.

Figure 3:
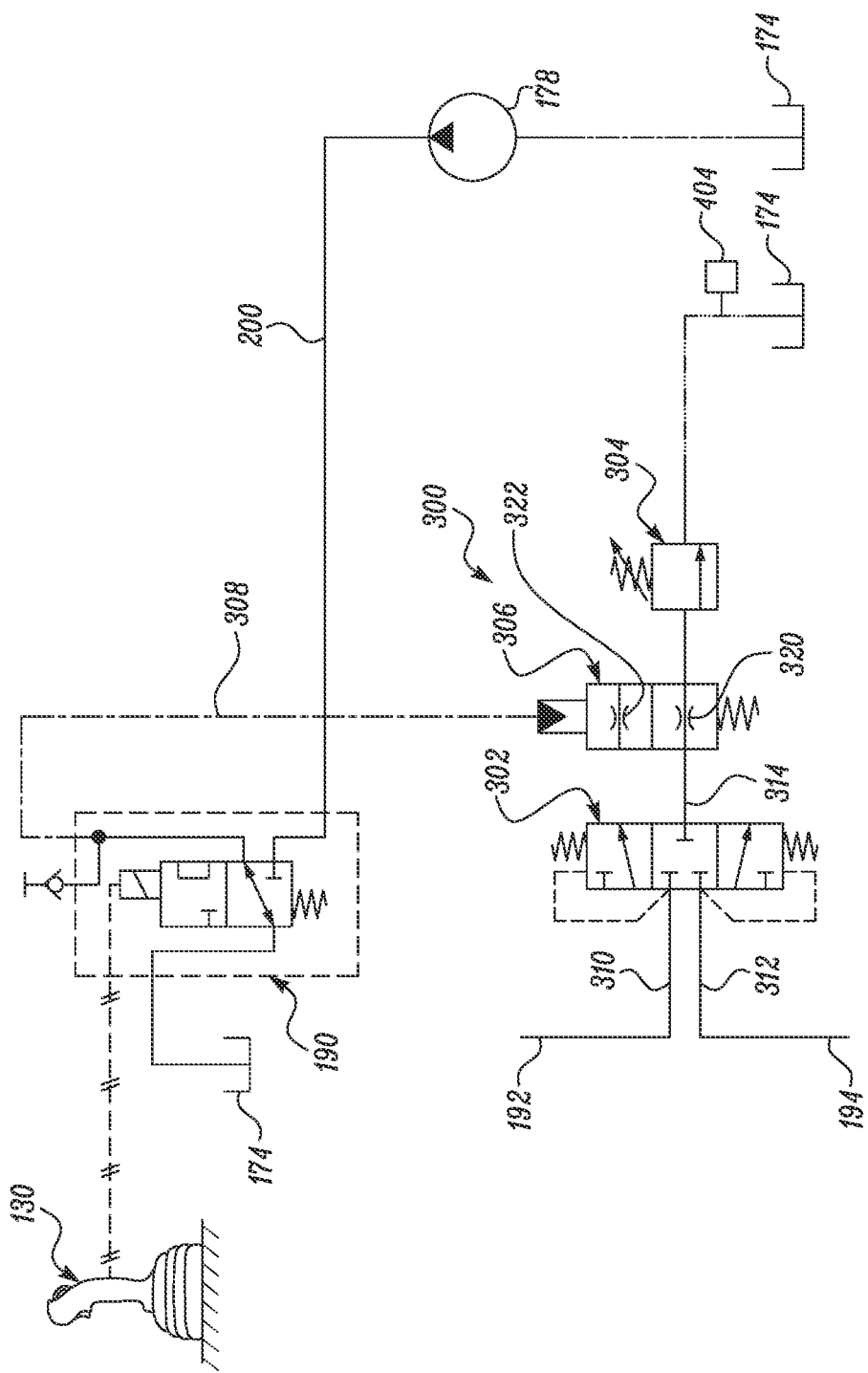
FIG. 3 illustrates a system for controlling an operation of the first hydrostatic circuit, in accordance with an embodiment of the present disclosure.

Referring to FIGS. 2 and 3, a system 300 is shown. The system 300 is configured to control the operation of the hydrostatic circuit 170 based on the at least one operating mode of the hydrostatic circuit 170. For instance, the system 300 may regulate a flushing flow rate of the fluid circulating in the hydrostatic circuit 170 based on the at least one operating mode of the hydrostatic circuit 170.

The system 300 that is fluidly coupled with the first hydrostatic circuit 172 is now discussed. The system 300 may include a shuttle valve 302 and a relief valve 304. The shuttle valve 302 may be fluidly coupled to the first fluid line 192 and the second fluid line 194, via a first flush line 310 and a second flush line 312, respectively. Also, the shuttle valve 302 may be fluidly coupled to the reservoir 174 via a flush outlet line 314. The shuttle valve 302 may be configured to move between three positions—a normally closed position (as shown in FIG. 3), a first open position, and a second open position. In an event a pressure in the first fluid line 192 exceeds with respect to the second fluid line 194, the shuttle valve 302 may move to the first open position to fluidly connect the second flush line 312 with the flush outlet line 314. Similarly, in an event the pressure in the second fluid line 194 exceeds with respect to the first fluid line 192, the shuttle valve 302 may move to the second open position to fluidly connect the first flush line 310 with the flush outlet line 314.

The relief valve 304 may be disposed along the flush outlet line 314. Also, the relief valve 304 may be disposed downstream of the shuttle valve 302 and upstream of the reservoir 174. The relief valve 304 may be configured to move between a normally closed position (as shown in FIG. 3) and an open position to control the flow of the fluid from the flush outlet line 314 to the reservoir 174. For instance, if the pressure in the flush outlet line 314 exceeds a certain pressure value, the relief valve 304 may move from the normally closed position to the open position to direct the fluid to flow towards the reservoir 174. In another instance, if the charge pressure in the first hydrostatic circuit 172 reduces below a certain pressure value, the relief valve 304 may restrict the fluid to flow towards the reservoir 174 to mitigate or avoid pressure drop in the first hydrostatic circuit 172 and in turn avoid a potential pump cavitation event.

Further, the system 300 includes a flush control valve 306 and a pressure control line 308. Details related to each of the flush control valve 306 and the pressure control line 308 will be discussed in detail below.

The flush control valve 306 (hereinafter referred to as "first flush control valve 306") includes two orifices—a first orifice 320 and a second orifice 322. The first orifice 320 and the second orifice 322 may be configured to allow the fluid to pass therethrough at different desired flushing flow rates, i.e., the first orifice 320 may allow the fluid to pass therethrough at a first desired flushing flow rate and the second orifice 322 may allow the fluid to pass therethrough at a second desired flushing flow rate. For that, a cross-sectional area of one of the first orifice 320 or the second orifice 322 may be larger than a cross-sectional area of the other of the first orifice 320 or the second orifice 322. In the present embodiment, the cross-sectional area of the second orifice 322 is larger than the cross-sectional area of the first orifice 320. For example, the cross-sectional area of the first orifice 320 is 30 square millimeters and the cross-sectional area of the second orifice 322 is 70 square millimeters. Although it is shown in the illustrated embodiment of FIG. 3 that the first flush control valve 306 includes two orifices, it may be contemplated that the first flush control valve 306 may include more than two orifices.

In other embodiments, the cross-sectional area of the first orifice 320 may be larger than the cross-sectional area of the second orifice 322. For example, a flush control valve 306 (hereinafter referred to as "second flush control valve 306") associated with the second hydrostatic circuit 172' may include a first orifice 320 having a cross-sectional area of 30 square millimeters, and a second orifice 322 having a cross-sectional area of 20 square millimeters. Accordingly, the first orifice 320 of the second flush control valve 306 may allow the fluid to pass therethrough at a third desired flushing flow rate, and the second orifice 322 of the second flush control valve 306 may allow the fluid to pass therethrough at a fourth desired flushing flow rate.

Continuing with FIG. 3, the first flush control valve 306 may be disposed along the flush outlet line 314. Further, the first flush control valve 306 may be disposed downstream of the shuttle valve 302 and upstream of the relief valve 304. In that manner, the first flush control valve 306 is configured to be fluidly coupled to the first hydrostatic circuit 172 (or the hydrostatic circuit 170). In other embodiments, the first flush control valve 306 may be disposed at any suitable position along the flush outlet line 314, such as downstream of the relief valve 304, and the like.

Further, the first flush control valve 306 is fluidly coupled to the pressure control line 308. The pressure control line 308 may fluidly connect the first flush control valve 306 and the function mode activation valve 190 (as shown in FIG. 3). The pressure control line 308 is configured to generate a signal (e.g., a pressure signal) indicative of the at least one operating mode of the first hydrostatic circuit 172. The pressure control line 308 may generate the signal according to the fluid pressure available in the first hydrostatic circuit 172 operating in the at least one operating mode. For instance, when the function mode activation valve 190 may move to the first position (in response to the input to activate the first operating mode of the first hydrostatic circuit 172, as shown in FIGS. 2 and 3), the pressure control line 308 may generate a first pressure signal having a zero magnitude. In another instance, when the function mode activation valve 190 may move to the second position (in response to the input to activate the second operating mode of the first hydrostatic circuit 172), the pressure control line 308 may generate a second pressure signal having a non-zero magnitude. Further, the pressure control line 308 is configured to deliver the signal to the first flush control valve 306.

The first flush control valve 306 is configured to receive the signal indicative of the at least one operating mode of the first hydrostatic circuit 172 from the pressure control line 308. Based on the signal received, the first flush control valve 306 may move and regulate the flushing flow rate of the fluid to equalize the flushing flow rate with a desired flushing flow rate. For example, based on reception of a signal (e.g., first pressure signal having a zero magnitude) indicative of the first operating mode of the first hydrostatic circuit 172, the first flush control valve 306 may move to a first position (e.g., a default position as shown in FIGS. 2 and 3). In the first position, the first flush control valve 306 may direct the flow of the fluid through the first orifice 320 at the first desired flushing flow rate. Further, for example, based on reception of a signal (e.g., second pressure signal having a non-zero magnitude) indicative of the second operating mode of the first hydrostatic circuit 172, the first flush control valve 306 may move from the first position to a second position (e.g., an actuated position). In the second position, the first flush control valve 306 may direct the flow of the fluid through the second orifice 322 at the second desired flushing flow rate.

Figure 4:
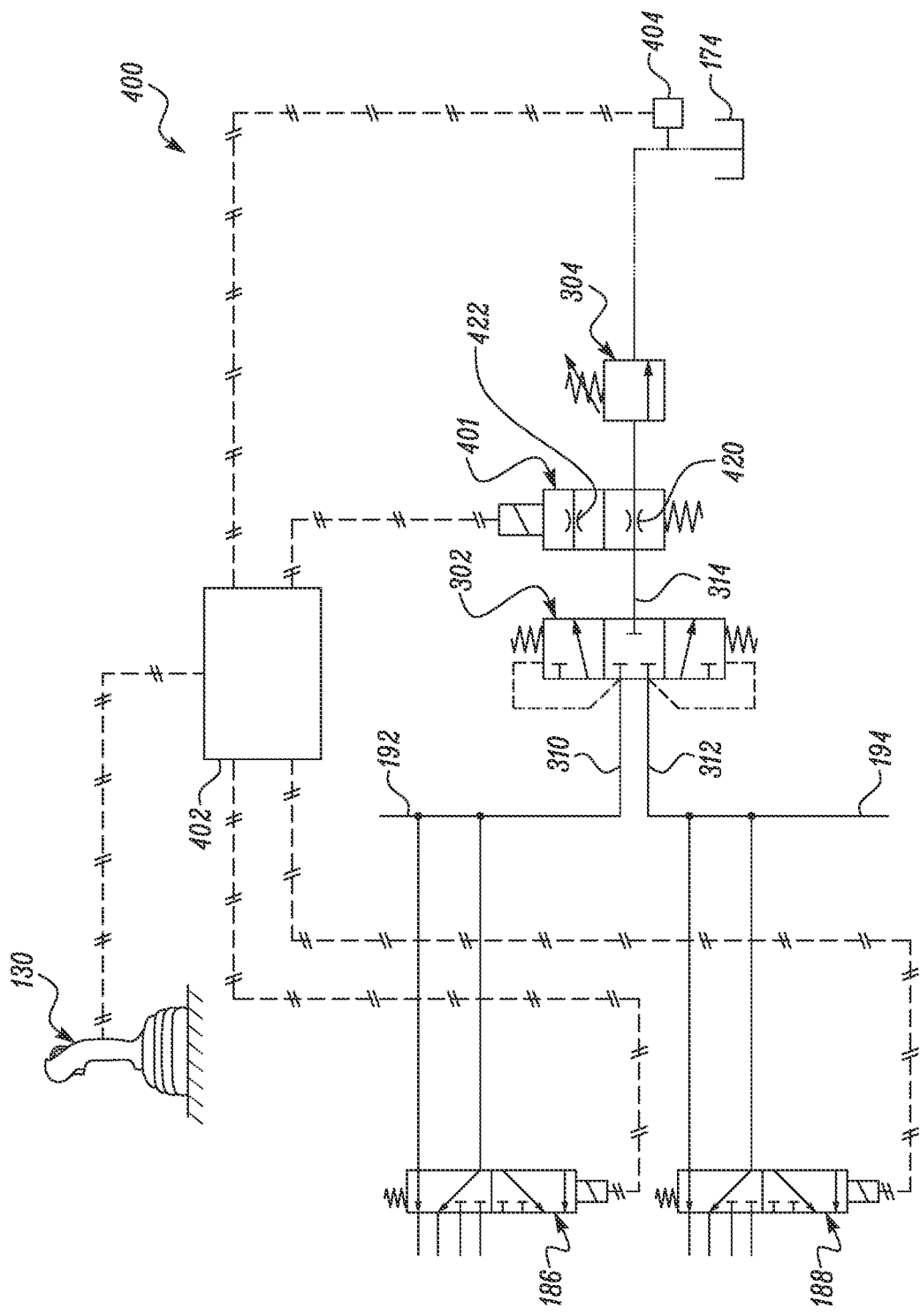
FIG. 4 illustrates a system for controlling an operation of the first hydrostatic circuit, in accordance with another embodiment of the present disclosure.

Referring to FIG. 4, a system 400 associated with the first hydrostatic circuit 172 is shown. The system 400 is similar to the system 300 but differs from the system 300 in that the first flush control valve 306 and the pressure control line 308 are omitted. Rather, the system 400 includes a first flush control valve 401 and a controller 402. The first flush control valve 401 may be similar to the first flush control valve 306 but differ from the first flush control valve 306 in that the first flush control valve 401 is solenoid actuated. Accordingly, a further description of the first flush control valve 401 is omitted for purposes of conciseness.

The controller 402 may be communicably coupled (e.g., wirelessly) to the input device 130 associated with the work machine 100. The controller 402 may be able to detect an actuation of the input device 130 and receive an input corresponding to the at least one operating mode of the at least two operating modes of the first hydrostatic circuit 172 from the input device 130. In response to the receipt of the input, the controller 402 may be configured to set the desired flushing flow rate of the fluid. In an example, on receipt of an input corresponding to the tramming operation of the work machine 100, the controller 402 may set the desired flushing flow rate to the first desired flushing flow rate. In another example, on receipt of an input corresponding to the drilling operation of the work machine 100, the controller 402 may set the desired flushing flow rate to the second desired flushing flow rate.

Based on the desired flushing flow rate, the controller 402 may be configured to generate signals (e.g., electrical signals). For example, the controller 402 may generate a first electrical signal having a zero current magnitude based on receipt of the input corresponding to the tramming operation of the work machine 100, and may generate a second electrical signal having a non-zero current magnitude based on receipt of the input corresponding to the drilling operation of the work machine 100. Further, the controller 402 is configured to be communicably coupled to the first flush control valve 401 to deliver the electrical signal to the first flush control valve 401 and move or control the first flush control valve 401 accordingly.

Additionally, in some embodiments, the controller 402 may be communicably coupled to one or more temperature sensors (e.g., a temperature sensor 404) to receive temperature readings of the fluid in the first hydrostatic circuit 172. Pursuant to the receipt of the temperature readings, the controller 402 may determine a variation in temperature of the fluid. Based on the variation in the temperature of the fluid, the controller 402 may set a desired flushing flow rate of the fluid, and generate and deliver a corresponding signal to the first flush control valve 401 to move or control the first flush control valve 401 accordingly.

Further, in some embodiments, the controller 402 may be configured to set the desired flushing flow rate of one of the first flush control valve 401 or a second flush control valve 401 (associated with the second hydrostatic circuit 172') based on the desired flushing flow rate of the other of the first flush control valve 401 or the second flush control valve 401. For instance, a reduction in the desired flushing flow rate through one of the first flush control valve 401 or the second flush control valve 401 allows the controller 402 to increase the desired flushing flow rate through the other of the first flush control valve 401 or the second flush control valve 401.

Figure 5:
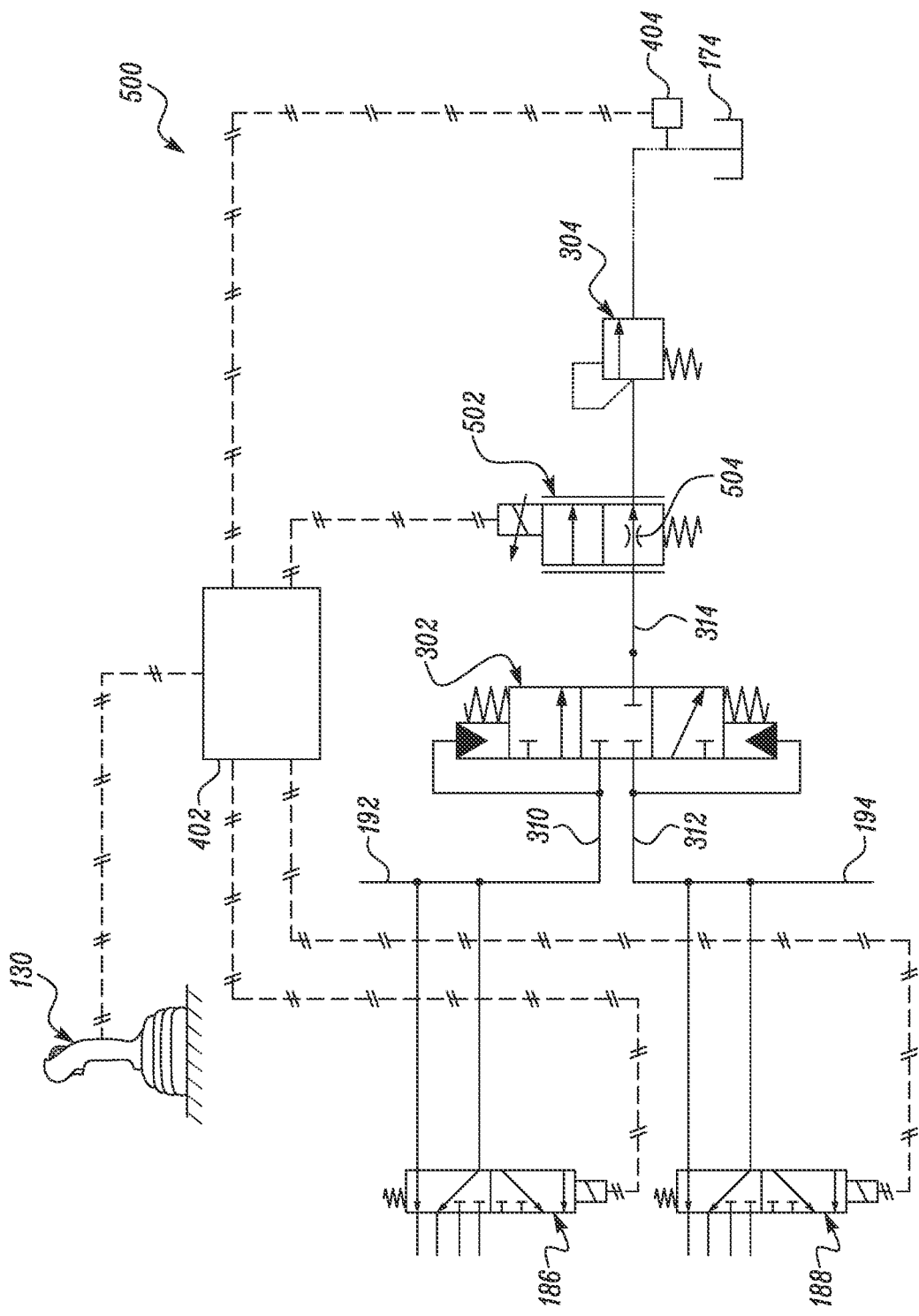
FIG. 5 illustrates a system for controlling an operation of the first hydrostatic circuit, in accordance with yet another embodiment of the present disclosure.

Referring to FIG. 5, a system 500 is shown. The system 500 is similar to the system 400 but differs from the system 400 in that the first flush control valve 401 is omitted. Rather, the system 500 includes a first flush control valve 502 disposed along the flush outlet line 314 downstream of the shuttle valve 302 and upstream of the relief valve 304. The first flush control valve 502 is a proportional solenoid operated flow control valve. The first flush control valve 502 may be configured to move between a plurality of positions to allow the fluid to pass therethrough at a plurality of different desired flushing flow rates. In the present embodiment, a fixed orifice 504 is provided in conjunction with the first flush control valve 502.

Further, the first flush control valve 502 is communicably coupled to the controller 402. Accordingly, the first flush control valve 502 is configured to receive electrical signal (e.g., proportional signal having a non-zero current magnitude) indicative of the at least one operating mode of the first hydrostatic circuit 172 from the controller 402. Based on the signal, the first flush control valve 502 may move to proportionally vary (e.g., increase or decrease) the flushing flow rate of the fluid to equalize the flushing flow rate with the desired flushing flow rate. Additionally, when the first flush control valve 502 receive an electrical signal of zero current magnitude from the controller 402, the first flush control valve 502 may move to direct the flow of fluid through the fixed orifice 504.

INDUSTRIAL APPLICABILITY

During operation, an operator of the work machine 100 may desire to move the work machine 100 to a drilling location at the jobsite 102. In this regard, the operator may manipulate/actuate an input device (e.g., the input device 130) to tram the work machine 100 towards the drilling location. In response to the manipulation/actuation of the input device 130, the function mode activation valve 190 may move to the first position to activate the first operating mode of the first hydrostatic circuit 172 and the second hydrostatic circuit 172', respectively (as shown in FIG. 2). Accordingly, the function mode activation valve 190 may control the first diverter valve 186 to move to the first position to fluidly connect the corresponding hydrostatic pump 176 with the first tram motor 146, and may control the second diverter valve 188 to move to the first position to fluidly connect the first tram motor 146 with the corresponding hydrostatic pump 176. In that manner, the first diverter valve 186 and the second diverter valve 188 may move synchronously to their corresponding first positions to activate the first operating mode of the first hydrostatic circuit 172. Simultaneously, the function mode activation valve 190 may control the third diverter valve 186' to move to the first position to fluidly connect the corresponding hydrostatic pump 176 with the second tram motor 148, and may control the fourth diverter valve 188' to move to the first position to fluidly connect the second tram motor 148 with the corresponding hydrostatic pump 176. In that manner, the third diverter valve 186' and the fourth diverter valve 188' may move synchronously to their corresponding first positions to activate the first operating mode of the second hydrostatic circuit 172'.

Once the first hydrostatic circuit 172 and the second hydrostatic circuit 172' start operating in the first operating mode, the pressure control line 308 may generate and deliver a signal (e.g., first pressure signal having a zero magnitude) to the first and second flush control valves 306 of the first hydrostatic circuit 172 and the second hydrostatic circuit 172', respectively. Pursuant to the reception of the signal, the first flush control valve 306 of the first hydrostatic circuit 172 may move to the first position (e.g., default position, as shown in FIGS. 2 and 3) to direct the flow of the fluid through the corresponding first orifice 320 at the first desired flushing flow rate, and the second flush control valve 306 of the second hydrostatic circuit 172' may move to the first position (e.g., default position, as shown FIGS. 2 and 3) to direct the flow of the fluid through the corresponding first orifice 320 at the third desired flushing flow rate. In the present embodiment, the first desired flushing flow rate and the third desired flushing flow rate are equal.

Once the work machine 100 arrives at the drilling location, the operator may desire to perform the drilling operation. In this regard, the operator may manipulate/actuate the input device 130 to halt the tramming of the work machine 100 at the drilling location and start the drilling operation. In response to the manipulation/actuation of the input device 130, the function mode activation valve 190 may activate the second operating mode of the first hydrostatic circuit 172 and second hydrostatic circuit 172', respectively. Accordingly, the function mode activation valve 190 may control the first diverter valve 186 to move from the first position to the second position to fluidly connect the corresponding hydrostatic pump 176 with the drill motor assembly 142, and may control the second diverter valve 188 to move from the first position to the second position to fluidly connect the drill motor assembly 142 with the corresponding hydrostatic pump 176. In that manner, the first diverter valve 186 and the second diverter valve 188 may move synchronously to their corresponding second positions to activate the second operating mode of the first hydrostatic circuit 172. Similarly, the function mode activation valve 190 may control the third diverter valve 186' to move from the first position to the second position to fluidly connect the corresponding hydrostatic pump 176 with the feed cylinder 144, and may control the fourth diverter valve 188' to move from the first position to the second position to fluidly connect the feed cylinder 144 with the corresponding hydrostatic pump 176. In that manner, the third diverter valve 186' and the fourth diverter valve 188' may move synchronously to their corresponding second positions to activate the second operating mode of the second hydrostatic circuit 172'.

Once the first hydrostatic circuit 172 and the second hydrostatic circuit 172' starts operating in the second operating mode, the pressure control line 308 may generate and deliver another signal (e.g., second pressure signal having a non-zero magnitude) to the first and second flush control valves 306 of the first hydrostatic circuit 172 and the second hydrostatic circuit 172', respectively. Pursuant to the reception of the signal, the first flush control valve 306 of the first hydrostatic circuit 172 may move from the first position to the second position to direct the flow of the fluid through the corresponding second orifice 322 at the second desired flushing flow rate, greater than the first desired flushing flow rate. Similarly, the second flush control valve 306 of the second hydrostatic circuit 172' may move from the first position to the second position to direct the flow of the fluid through the corresponding second orifice 322 at the fourth desired flushing flow rate, lesser than the third desired flushing flow rate.

According to the embodiment of the system 400, as disclosed in FIG. 4, when the operator actuates the input device 130 to tram the work machine 100 to the drilling location, the controller 402 may receive an input corresponding to the first operating mode of the first hydrostatic circuit 172 and the second hydrostatic circuit 172', respectively, from the input device 130. Pursuant to the reception of the input, the controller 402 may control the first diverter valve 186, the second diverter valve 188, the third diverter valve 186', and the fourth diverter valve 188' to move to their corresponding first positions to activate the first operating mode of the first hydrostatic circuit 172 and the second hydrostatic circuit 172', respectively. In some embodiments, the controller 402 may control the function mode activation valve 190, which, in turn, control the movement of the first diverter valve 186, the second diverter valve 188, the third diverter valve 186', and the fourth diverter valve 188'.

In addition, the controller 402 may generate and deliver a signal (e.g., first electrical signal having a zero current magnitude) indicative of the first operating mode to the first and second flush control valves 401 of the first hydrostatic circuit 172 and the second hydrostatic circuit 172', respectively. Pursuant to the reception of the signal, the first flush control valve 401 of the first hydrostatic circuit 172 may move to the first position (e.g., default position, as shown in FIG. 4) to direct the flow of the fluid through a corresponding first orifice 420 at a first desired flushing flow rate, and the second flush control valve 401 of the second hydrostatic circuit 172' may move to the first position (e.g., default position) to direct the flow of the fluid through a corresponding first orifice 420 at a third desired flushing flow rate.

Once the work machine 100 arrives at the drilling location, the operator may manipulate/actuate the input device 130 to halt the work machine 100 at the drilling location and start the drilling operation. Based on the actuation/manipulation of the input device 130, the controller 402 may receive an input corresponding to the second operating mode of the first hydrostatic circuit 172 and the second hydrostatic circuit 172', respectively, from the input device 130. Pursuant to the reception of the input, the controller 402 may control the first diverter valve 186, the second diverter valve 188, the third diverter valve 186', and the fourth diverter valve 188' to move to their corresponding second positions to activate the second operating mode of the first hydrostatic circuit 172 and the second hydrostatic circuit 172', respectively. In addition, the controller 402 may generate and deliver another signal (e.g., second electrical signal having a non-zero current magnitude) indicative of the second operating mode to the first and second flush control valves 401 of the first hydrostatic circuit 172 and the second hydrostatic circuit 172', respectively.

Pursuant to the reception of the signal, the first flush control valve 401 of the first hydrostatic circuit 172 may move from the first position to the second position to direct the flow of the fluid through a corresponding second orifice 422 at a second desired flushing flow rate, greater than the first desired flushing flow rate. Similarly, the second flush control valve 401 of the second hydrostatic circuit 172' may move from the first position to the second position to direct the flow of the fluid through a corresponding second orifice 422 at a fourth desired flushing flow rate, lesser than the third desired flushing flow rate.

Additionally, the controller 402 may receive temperature readings of the fluid circulating in the first hydrostatic circuit 172 and the second hydrostatic circuit 172', respectively, from the corresponding temperature sensors 404 associated with the first hydrostatic circuit 172 and the second hydrostatic circuit 172'. Based on the temperature readings, the controller 402 may determine a variation (increase or decrease) in the temperature of the fluid circulating in the first hydrostatic circuit 172 and the second hydrostatic circuit 172', respectively. Accordingly, the controller 402 may set a desired flushing flow rate of the fluid, and generate and deliver the corresponding signal to the first and second flush control valves 401 of the first hydrostatic circuit 172 and the second hydrostatic circuit 172', respectively, to move or control the first and second flush control valves 401. For example, in at least one operating mode (e.g., second operating mode), if the controller 402 determines that the temperature of the fluid circulating in the first hydrostatic circuit 172 exceeds a threshold temperature (pre-stored in a memory/server associated with the controller 402), the controller 402 may move the first flush control valve 401 of the first hydrostatic circuit 172 to a position (e.g., second position) to direct the flow of the fluid through an orifice (e.g., second orifice) having relatively larger cross-sectional area than a cross-sectional area of the other orifice. In that manner, the controller 402 may flush out the fluid from the first hydrostatic circuit 172 at relatively higher flushing flow rate and maintain the temperature of the first hydrostatic circuit 172.

In the case of the system 300 and the system 400, the first and second flush control valves 306 and the first and second flush control valves 401 may be configured to move to two fixed positions (i.e., first position and second position) to allow the fluid to pass therethrough at two desired flushing flow rates.

According to the embodiment of the system 500, as disclosed in FIG. 5, during the tramming operation, the first flush control valve 502 of the first hydrostatic circuit 172 and a second flush control valve 502 the second hydrostatic circuit 172' may receive a proportional electrical signal indicative of the first operating mode of the first hydrostatic circuit 172 and the second hydrostatic circuit 172', from the controller 402. Pursuant to the reception of the signal, both the first and second flush control valves 502 may move to a position of the plurality of positions to allow the fluid to pass therethrough at the first desired flushing flow rate of the plurality of different desired flushing flow rates.

During the drilling operation, the first and second flush control valves 502 may receive another proportional electrical signal indicative of the second operating mode of the first hydrostatic circuit 172 and the second hydrostatic circuit 172', from the controller 402. Pursuant to the reception of the signal, the first flush control valve 502 corresponding to the first hydrostatic circuit 172 may move to another position of the plurality of positions to proportionally increase the flushing flow rate of the fluid passing therethrough. Similarly, pursuant to the reception of the signal, the second flush control valve 502 corresponding to the second hydrostatic circuit 172' may move to yet another position of the plurality of positions to proportionally decrease the flushing flow rate of the fluid passing therethrough. In that manner, the system 500 provides a smooth and continuous transition of the flushing flow rate of the fluid when the first hydrostatic circuit 172 and/or the second hydrostatic circuit 172' switches between the first operating mode and the second operating mode.

Additionally, the first and second flush control valves 502 may receive signals (generated based on the variation in temperature of the fluid) from the controller 402, and accordingly, move to precisely increase or decrease the flushing flow rate of the fluid. In that manner, the flushing flow rate of the fluid may be further fine-tuned for efficiently maintaining the temperature of the fluid flowing in the corresponding first hydrostatic circuit 172 and the second hydrostatic circuit 172'.

The system 300, 400, or 500, may be easily installed on the work machine 100, for example—by the operator of the work machine 100. For that, the operator may fluidly couple the first flush control valve 306 (or first flush control valve 401, or first flush control valve 502) to the first hydrostatic circuit 172. Further, the operator may decide to fluidly couple either the pressure control line 308 or the controller 402 with the first flush control valve 306 (or first flush control valve 401, or first flush control valve 502). In an example, the operator may fluidly couple the first flush control valve 306 with the pressure control line 308 and use the pressure control line 308 to generate and deliver signals to the first flush control valve 306. In another example, the operator may communicably couple the first flush control valve 306 (or first flush control valve 401, or the first flush control valve 502) with the controller 402 to use the controller 402 to generate and deliver signals to the first flush control valve 306 (or first flush control valve 401, or the first flush control valve 502).

The system 300, 400, or 500, facilitates the hydrostatic circuit 170 (first hydrostatic circuit 172 and second hydrostatic circuit 172') to flush out the fluid at the desired flushing flow rates based on their operating modes and/or temperatures of the fluid circulating therein. Utilizing the system 300, 400, or 500, may mitigate the risk of overheating the fluid circulating in the hydrostatic circuit 170 and maintain the desired temperature of the hydrostatic circuit 170. In addition, utilizing the system 300, 400, or 500, may mitigate or eliminate the need to increase the cooling capacity of the hydrostatic circuit 170.

Although the concepts of the present disclosure are discussed in the context of the drilling machine 100', the system 300, 400, and 500, may be suitably applied to any hydraulic circuit (e.g., any closed loop hydrostatic circuit that requires flushing) of any machine.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. A system for controlling an operation of a hydrostatic circuit of a work machine, wherein the hydrostatic circuit is operable in a first operating mode and a second operating mode to supply fluid power to selectively run a plurality of sub-systems of the work machine, the system comprising:
   a flush control valve fluidly coupled to the hydrostatic circuit and configured to receive a signal indicative of an operating mode of the hydrostatic circuit, wherein:
      when the signal indicates that the hydrostatic circuit is in the first operating mode, the flush control valve moves to a first open position associated with a first flushing flow rate of the fluid; and
      when the signal indicates that the hydrostatic circuit is in the second operating mode, the flush control valve moves to a second open position associated with a second flushing flow rate of the fluid, wherein the second flushing flow rate is different than the first flushing flow rate.

2. The system of claim 1, further including:
   a pressure control line fluidly coupled to the flush control valve and configured to generate and deliver the signal to the flush control valve, wherein the signal is configured to be generated according to a fluid pressure available in the hydrostatic circuit in the first and second operating modes of the hydrostatic circuit.

3. The system of claim 1, wherein:
   the flush control valve includes a first orifice having a first orifice cross-sectional area, and a second orifice having a second orifice cross-sectional area, wherein the first orifice cross-sectional area is larger than the second orifice cross-sectional area;
   when the hydrostatic circuit is in the first operating mode and the flush control valve is in the first open position, the fluid flows through the first orifice to generate the first flushing flow rate of fluid; and when the hydrostatic circuit is in the second operating mode and the flush control valve is in the second open position, the fluid flows through the second orifice to generate the second flushing flow rate of fluid.

4. The system of claim 1, further including:
a controller configured to be communicably coupled to the flush control valve, the controller being configured to generate and deliver the signal according to an input to activate the hydrostatic circuit in one of the first and second operating modes.

5. The system of claim 4, wherein the flush control valve is a proportional solenoid operated flow control valve configured to receive the signal from the controller.

6. The system of claim 4, wherein:
the first flushing flow rate is greater than the second flushing flow rate;
the controller is configured to move the flush control valve to the first open position thereby to increase the flushing flow rate of the fluid in accordance with an increase in temperature of the fluid in the hydrostatic circuit, and
the controller is configured to move the flush control valve to the second open position thereby to decrease the flushing flow rate of the fluid in accordance with a decrease in temperature of the fluid in the hydrostatic circuit.

7. The system of claim 4, wherein the hydrostatic circuit is a first hydrostatic circuit and the flush control valve is a first flush control valve, the work machine including a second hydrostatic circuit and a second flush control valve, wherein the controller is configured to:
set a desired flushing flow rate of one of the first flush control valve or the second flush control valve based on a desired flushing flow rate of the other of the first flush control valve or the second flush control valve, wherein a reduction in the desired flushing flow rate through one of the first flush control valve or the second flush control valve allows the controller to increase the desired flushing flow rate through the other of the first flush control valve or the second flush control valve.

8. A method for controlling an operation of a hydrostatic circuit of a work machine, wherein the hydrostatic circuit is operable in a first operating mode and a second operating mode to supply fluid power to selectively run a plurality of sub-systems of the work machine the method comprising:
fluidly coupling a flush control valve to the hydrostatic circuit, wherein the flush control valve is configured to receive a signal indicative of an operating mode of the hydrostatic circuit;
moving the flush control valve to a first open position, associated with a first flushing flow rate of fluid, when the signal indicates that the hydrostatic circuit is in the first operating mode; and
moving the flush control valve to a second open position, associated with a second flushing flow rate of fluid, when the signal indicates that the hydrostatic circuit is in the second operating mode, wherein the second flushing flow rate is different than the first flushing flow rate.

9. The method of claim 8, further including:
fluidly coupling a pressure control line to the flush control valve, wherein the pressure control line is configured to generate and deliver the signal to the flush control valve, wherein the signal is configured to be generated according to a fluid pressure available in the hydrostatic circuit in the first and second operating modes of the hydrostatic circuit.

10. The method of claim 8, wherein:
the flush control valve includes a first orifice having a first orifice cross-sectional area, and a second orifice having a second orifice cross-sectional area, wherein the first orifice cross-sectional area is larger than the second orifice cross-sectional area;
when the hydrostatic circuit is in the first operating mode and the flush control valve is in the first open position, the fluid flows through the first orifice to generate the first flushing flow rate of fluid; and
when the hydrostatic circuit is in the second operating mode and the flush control valve is in the second open position, the fluid flows through the second orifice to generate the second flushing flow rate of fluid.

11. The method of claim 8, further including:
communicably coupling a controller to the flush control valve and using the controller to generate and deliver the signal according to an input to activate the hydrostatic circuit in one of the first and second operating modes.

12. The method of claim 11, wherein the flush control valve is a proportional solenoid operated flow control valve configured to receive the signal from the controller.

13. The method of claim 11, wherein:
the first flushing flow rate is greater than the second flushing flow rate;
the controller is configured to move the flush control valve to the first open position thereby to increase the flushing flow rate of the fluid in accordance with an increase in temperature of the fluid in the hydrostatic circuit, and
the controller is configured to move the flush control valve to the second open position thereby to decrease the flushing flow rate of the fluid in accordance with a decrease in temperature of the fluid in the hydrostatic circuit.

14. A work machine comprising:
a plurality of sub-systems;
a hydrostatic circuit operable in a first operating mode and a second operating mode to supply fluid power to selectively run the plurality of sub-systems; and
a flush control valve fluidly coupled to the hydrostatic circuit and configured to receive a signal indicative of an operating mode of the hydrostatic circuit, wherein:
when the signal indicates that the hydrostatic circuit is in the first operating mode, the flush control valve moves to a first open position associated with a first flushing flow rate of the fluid; and
when the signal indicates that the hydrostatic circuit is in the second operating mode, the flush control valve moves to a second open position associated with a second flushing flow rate of the fluid, wherein the second flushing flow rate is different than the first flushing flow rate.

15. The work machine of claim 14, further including:
a pressure control line fluidly coupled to the flush control valve and configured to generate and deliver the signal to the flush control valve, wherein the signal is configured to be generated according to a fluid pressure available in the hydrostatic circuit in the first and second operating modes of the hydrostatic circuit.

16. The work machine of claim 14, wherein:
the flush control valve includes a first orifice having a first orifice cross-sectional area, and a second orifice having a second orifice cross-sectional area, wherein the first orifice cross-sectional area is larger than the second orifice cross-sectional area;

when the hydrostatic circuit is in the first operating mode and the flush control valve is in the first open position, the fluid flows through the first orifice to generate the first flushing flow rate of fluid; and when the hydrostatic circuit is in the second operating mode and the flush control valve is in the second open position, the fluid flows through the second orifice to generate the second flushing flow rate of fluid.

17. The work machine of claim 14, further including:

a controller configured to be communicably coupled to the flush control valve, the controller being configured to generate and deliver the signal according to an input to activate the hydrostatic circuit in one of the first and second operating modes.

18. The work machine of claim 17, wherein the flush control valve is a proportional solenoid operated flow control valve configured to receive the signal from the controller.

19. The work machine of claim 17, wherein:

the first flushing flow rate is greater than the second flushing flow rate;

the controller is configured to move the flush control valve to the first open position thereby to increase the flushing flow rate of the fluid in accordance with an increase in temperature of the fluid in the hydrostatic circuit, and the controller is configured to move the flush control valve to the second open position thereby to decrease the flushing flow rate of the fluid in accordance with a decrease in temperature of the fluid in the hydrostatic circuit.

20. The work machine of claim 17, wherein the hydrostatic circuit is a first hydrostatic circuit and the flush control valve is a first flush control valve, the work machine including a second hydrostatic circuit and a second flush control valve, wherein the controller is configured to:

set a desired flushing flow rate of one of the first flush control valve or the second flush control valve based on a desired flushing flow rate of the other of the first flush control valve or the second flush control valve, wherein a reduction in the desired flushing flow rate through one of the first flush control valve or the second flush control valve allows the controller to increase the desired flushing flow rate through the other of the first flush control valve or the second flush control valve.

* * * * *